C. W. FORD.
BEET TOPPER.
APPLICATION FILED OCT. 22, 1912.
1,070,126.
Patented Aug. 12, 1913.
3 SHEETS—SHEET 3.
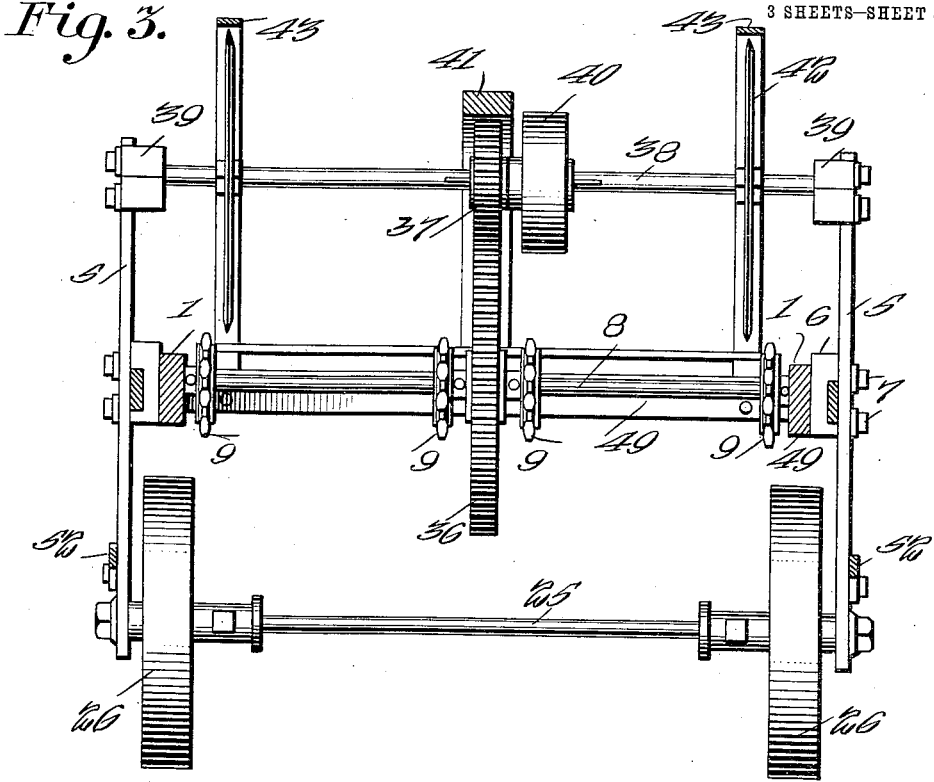
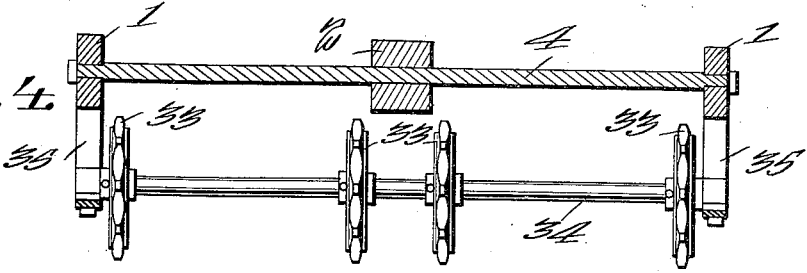
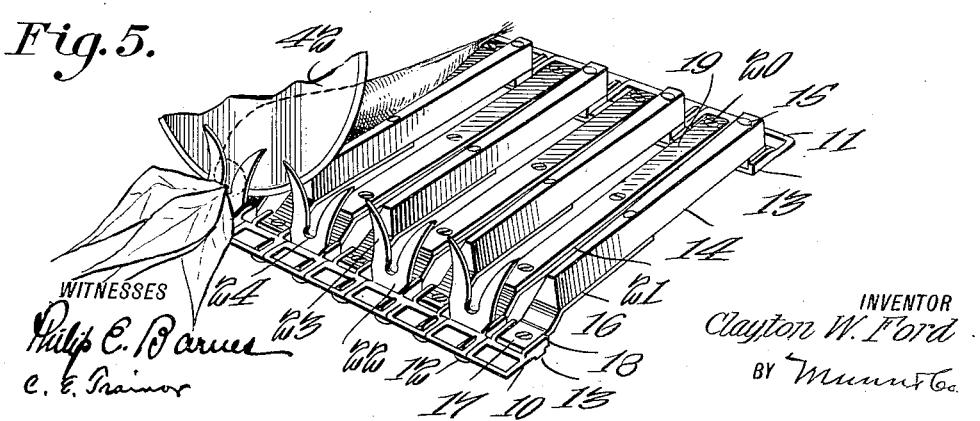
WITNESSES
INVENTOR
Clayton W. Ford
BY
ATTORNEYS

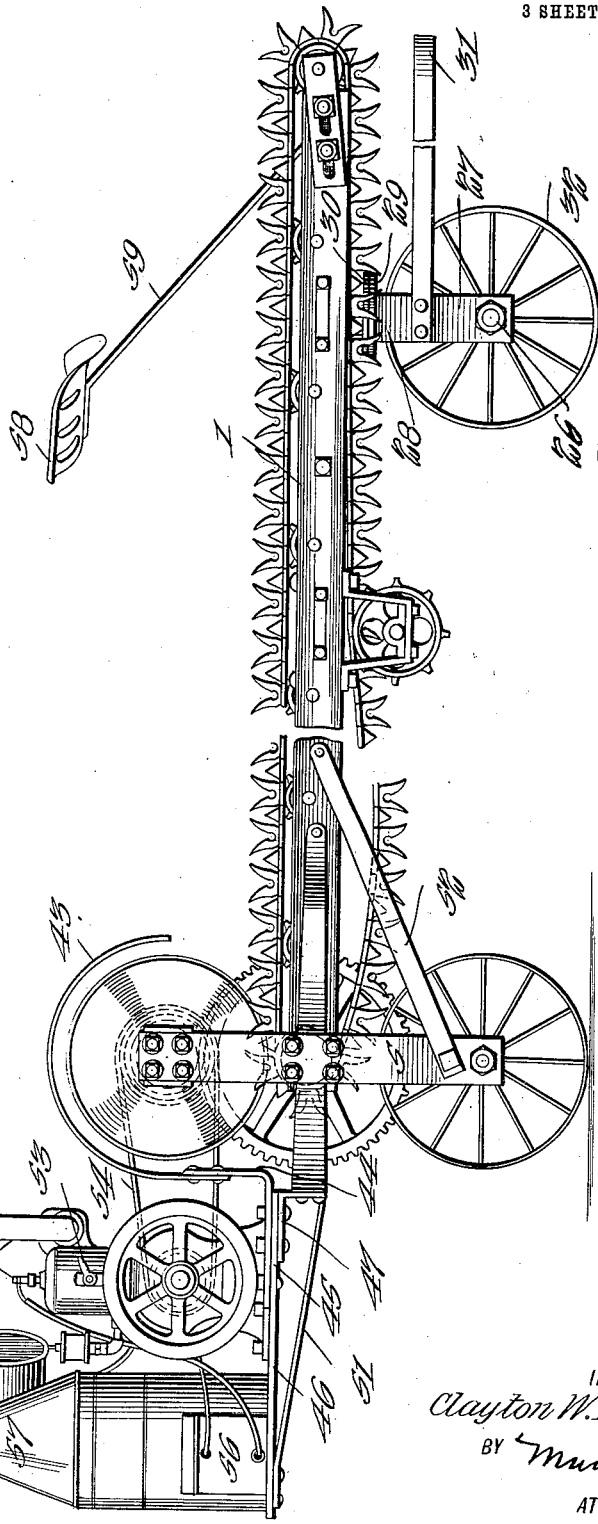

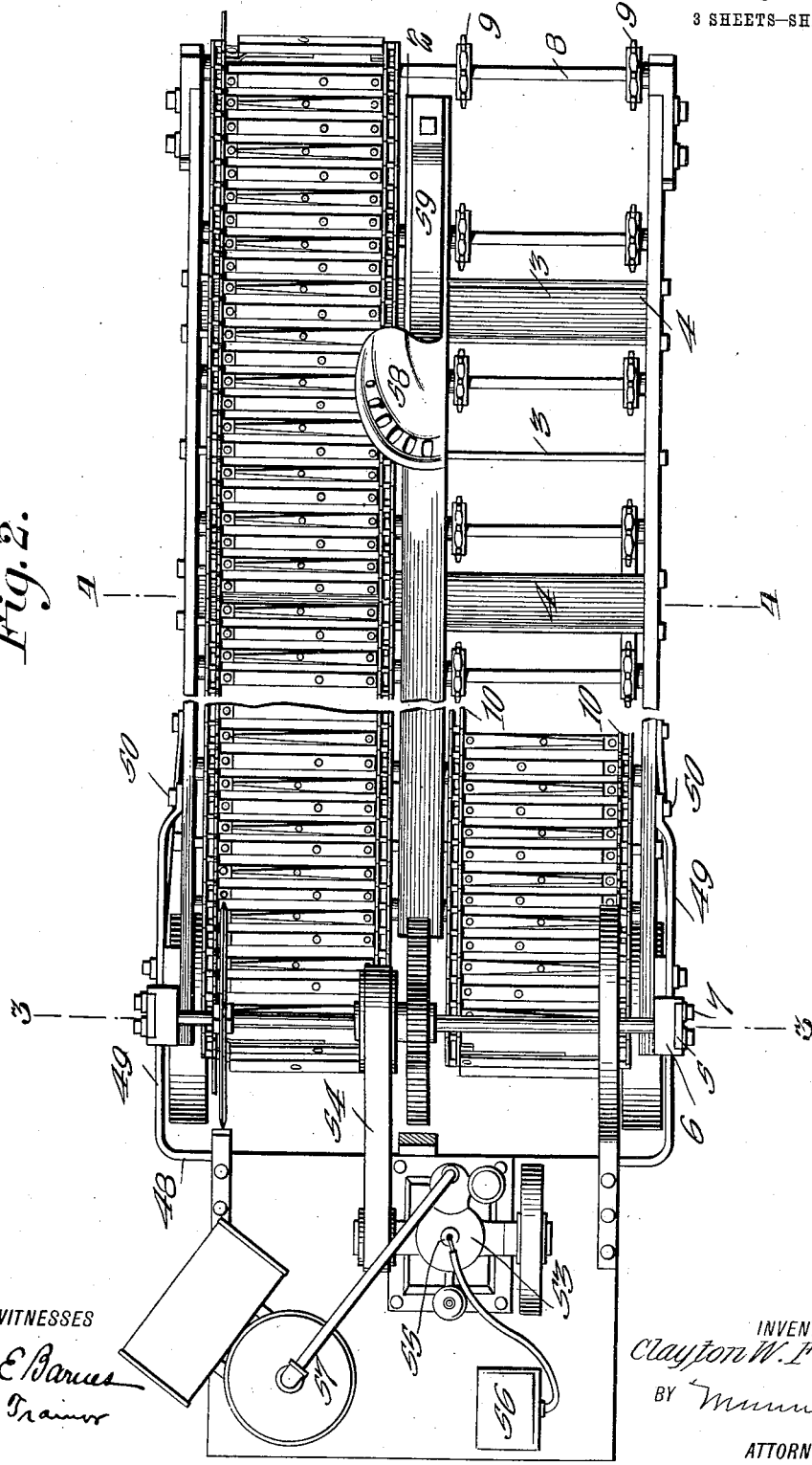

UNITED STATES PATENT OFFICE.

CLAYTON WARREN FORD, OF FINDLAY, OHIO.

BEET-TOPPER.

1,070,126.　　　Specification of Letters Patent.　　Patented Aug. 12, 1913.

Application filed October 22, 1912. Serial No. 727,132.

*To all whom it may concern:*

Be it known that I, CLAYTON W. FORD, a citizen of the United States, and a resident of Findlay, in the county of Hancock and State of Ohio, have invented a new and useful Improvement in Beet-Toppers, of which the following is a specification.

My invention is an improvement in beet toppers, and has for its object the provision of mechanism for supporting a series of beets alongside each other and with the tops extending in one direction and for moving the beets in succession beneath a topping mechanism, that will remove the tops, and so arranged that the mechanism may be drawn through the field.

In the drawings:—Figure 1 is a side view of the improved topper, Fig. 2 is a plan view, Figs. 3 and 4 are sections on the lines 3—3 and 4—4 respectively of Fig. 2, and Fig. 5 is a perspective view of a portion of one of the carriers.

The present embodiment of the invention comprises a supporting frame composed of longitudinally extending side plates 1 and a central bar 2, the side plates and the bar being arranged in parallel and spaced relation. The side plates and the bar are connected at intervals by cross bolts 3 sundry of which are arranged in pairs, and cross bars 4 space the plates, while the bolts 3 connect them together.

The bar 2 is of lesser length than the side plates, and the rear ends of the side plates extend beyond the rear end of the bar. A vertical plate 5 is secured to each bar 1 at its rear end, a spacing block 6 being arranged between each of the vertical plates and the plate 1, and the plates 5 are secured to the plates and the spacing blocks by means of the bolts 7.

A plurality of shafts 8 are journaled transversely of the side plates and the bar 2 in spaced relation, and each of the said shafts is provided with a pair of sprocket wheels 9 between each side plate and the cross bar, the members of each pair of sprocket wheels being arranged in spaced relation, and endless chains 10 are supported by the registering sprocket wheels 9; a chain being arranged adjacent to each side plate 1 and a chain on each side of the central bar 2. Each of the chains it will be noticed consists of a plurality of links 11, each having a hook 12 for engaging the adjacent link and each link is provided with a laterally extending lug 13, (Fig. 5).

The alternate links of the adjacent chains are connected by cross bars 14, each of the said bars being approximately triangular at its upper edge and arranged with the base of the said upper edge adjacent to the central bar 2. The said end of each of the bars is secured to the lug 13 of the adjacent chain by means of a rivet 15, and the other or outer end is connected to the lug 13 of the adjacent link by means of a clip 16, the body of the clip being secured to the bar by rivets or the like and having at its outer end a downwardly offset portion 17 secured to the lug 13 by means of a screw 18.

The intermediate links of the chains are connected by means of slats 19, each slat having its inner end connected to the lug 13 by means of a screw 20 and being connected at its opposite or outer end to the link by means of a clip 21, similar to the clip 16, before mentioned.

By the above-described construction, a plurality of holders are provided on each conveyer formed by the chains 10, the bars 14 and the slats 19, the said holders corresponding roughly to the conical shape of a beet. Each of the holders has its greatest width at its outer end, and each of the said holders is higher at the outer end than at its inner end by reason of the arrangement of the clips 16 and 21. At the outer end of each of the holders so formed, is arranged a species of yoke, whose body 22 is secured to the link, while the arms 23 extend upwardly. The said arms are curved outwardly and form guides for guiding and compressing the leaves of the tops as shown in Fig. 5 into an enlargement 24 at the junction of the arms with the body. The said enlargement is formed by cutting away the body in rounded form at the junction of the arms.

An axle 25 is supported in the lower ends of the vertical plates 5 and wheels 26 are supported on the ends of the axle. A front axle 26 is arranged at the front end of the frame below the same, and the said axle is supported in the arms 27 of a yoke, whose body portion 28 is secured to the lower member of a fifth wheel 29. The upper member 30 of the fifth wheel is secured to one of the cross bars 4 before mentioned, and a suitable draft apparatus 31 is connected to the arms of the yoke, and wheels 32 are supported on the axle 26.

The lower runs of the conveyers formed by the chains 10, the cross bars 14 and the slats 19 are supported by means of sprocket wheels 33 at approximately their center, the said wheels 33 being secured to a shaft 34, journaled in brackets 35 on the plates 1. The said conveyers are driven by means of a gear wheel 36 secured to the rearmost shaft 8, and meshing with a pinion 37, keyed to a shaft 38, journaled in bearings 39 on the upper ends of the vertical plates 5.

A pulley 40 is keyed to the shaft 38 adjacent to the pinion, and a guard 41 of arc-shaped form is arranged above the pinion 37 and the gear wheel 36. The tops are cut from the beets below the shaft 38 by means of disk cutters 42 secured to the shaft 38 before mentioned and each cutter is protected by means of an arc-shaped guard 43, secured to the up-standing member 44 of an angle plate, whose horizontal member 45 is secured to a platform 46 supported at the rear of the frame by means of an angle plate 47. One of the portions of the angle plate is secured to the body 48 of a U-shaped bracket, whose arms 49 extend forwardly along the outer face of each of the side plates and between the spacing block 6 and the vertical plates 5, and the said arms are secured to the side plates at their forward ends by means of bolts 50.

The platform is braced against the body 48 of the bracket 48—49 by means of braces 51, and the lower ends of the vertical plates 5 are braced against the side plates 1 by means of inclined braces 52. A motor 53 is supported on the platform, a gasolene engine in the present instance, and the said motor is connected to the pulley 40 by means of a belt 54. The spark plug 55 of the engine is connected to a battery in a battery box 56, and the engine is cooled from a water reservoir 57, the engine, battery box and reservoir being supported on the platform. It will be evident that any other form of suitable motor might be used instead of that shown. A seat 58 is supported above the front end of the central bar 2 by means of a spring plate 59.

In operation, the device may be utilized to top the beets in the field or after they have been gathered into a heap or pile. As a rule, the machine is drawn along the beet rows in any suitable manner and the beets are fed to the conveyers from both sides, being picked up by hand and dropped into the troughs or holders of the conveyers. The conveyers move at such a speed that the beets may be laid into the troughs with the tops in the forks 22—23. As the conveyers move toward the motor, the beets at each side of the machine, that is, the beets of each holder, will be brought beneath the disk cutters 42 which will cut off the tops. The tops will fall to the ground, and the beets will be delivered at the rear of the machine into any suitable holder or receptacle.

It will be noticed that the offsetting of the outer ends of the clips 16 causes the beets to lie in such position that the tops may be severed after the cutters 42 engage the carriers or conveyers. By reason of the mounting of the front axle, the machine may be steered or guided as desired.

I claim:—

1. A device of the character specified, comprising a wheel supported frame, an endless conveyer at each side of the frame, means for supporting each conveyer for movement longitudinally of the frame, each conveyer having a series of transverse holders, each holder being of greater cross section at its outer end and gradually decreasing in cross section toward its inner end, a fork on the conveyer at the outer end of each holder for receiving and compressing the top of the beet in the holder, a disk cutter at each side of the frame at the rear end thereof and between the holders and the forks for removing the tops from the beets, and means on the frame for driving the conveyers and the cutters.

2. A device of the character specified, comprising a wheel supported frame, an endless conveyer at each side of the frame, means for supporting each conveyer for movement longitudinally of the frame, each conveyer having a series of transverse holders, each holder being of greater cross section at its outer end and gradually decreasing in cross section toward its inner end, a fork on the conveyer at the outer end of each holder for receiving and compressing the top of the beet in the holder, and means at the rear of the frame and at each side thereof for removing the tops from the beets.

3. A device of the character specified, comprising a frame, an endless conveyer at each side of the frame, means for supporting each conveyer for movement longitudinally of the frame, each conveyer having a series of transverse holders for the beets, means on each conveyer at the outer end of each holder for receiving and compressing the tops of the beets, and means at the rear of the frame at each side thereof for removing the tops from the beets, said means comprising a disk cutter between the holders and the receiving and compressing means.

4. A device of the character specified, comprising a frame, an endless conveyer at each side of the frame, means for supporting each conveyer for movement longitudinally of the frame, each conveyer having a series of transverse holders for the beets, means on each conveyer at the outer end of each holder for receiving and compressing the tops of the beets, and means at the rear of the frame at each side thereof for removing the tops from the beets.

5. In a device of the character specified, an endless conveyer comprising spaced endless chains, each chain consisting of interengaging links, each link having a lateral lug at its inner side, bars connecting the lugs of the alternate links of the chains, each of the said bars being of greatest width at one end and decreasing in width toward the other end, slats connecting the lugs of the intermediate links of the chains, said slats and lugs having their outer ends offset upwardly from the plane of the chains, and means on each of the intermediate links of the chains at the narrow ends of the bars for receiving and compressing the tops of the beets, each of the said means consisting of a fork having its body secured to the link and having arms diverging upwardly and outwardly, said link having an enlargement at the junction of the arms for receiving the tops.

6. In a device of the character specified, an endless conveyer comprising spaced endless chains, each chain consisting of interengaging links, each link having a lateral lug at its inner side, bars connecting the lugs of the alternate links of the chains, each of the bars being of greatest width at one end and decreasing in width toward the other end, slats connecting the lugs of the intermediate links of the chains, said slats and lugs having their outer ends offset upwardly from the plane of the chains, and means on each of the intermediate links of the chains at the narrow ends of the bars for receiving and compressing the tops of the beets.

7. In a device of the character specified, an endless conveyer comprising spaced endless chains, each chain consisting of interengaging links, each link having a lateral lug at its inner side, bars connecting the lugs of the alternate links of the chains, each of the said bars being of greatest width at one end and decreasing in width toward the other end, slats connecting the lugs of the intermediate links of the chains, said slats and lugs having their outer ends offset upwardly from the plane of the chains.

8. In a device of the character specified, an endless conveyer having a series of transverse holders for the beets, each of the said holders being of greatest width at one end and decreasing in width at the opposite end, and means at the wide end of each holder for receiving and compressing the tops of the beets, said means comprising a fork having its body secured to the conveyer and having upwardly and outwardly diverging arms.

9. In a device of the character specified, an endless conveyer having a series of transverse holders for the beets, each of the said holders being of greatest width at one end and decreasing in width at the opposite end, and means at the wide end of each holder for receiving and compressing the tops of the beets.

10. A device of the character specified, comprising a plurality of holders for beets arranged alongside each other and connected together, means for moving the holders laterally, a relatively fixed cutter at one end of the holders for removing the tops of the beets as they are carried past the cutter in the holders, each holder having means at the end adjacent to the cutter for receiving and compressing the tops of the beets in the holder.

CLAYTON WARREN FORD.

Witnesses:
   H. F. BURKET,
   MAUDE E. BAUGHMAN.

---

Copies of this patent may be obtained for five cents each, by addressing the "Commissioner of Patents, Washington, D. C."